US009091100B2

(12) United States Patent
Yang

(10) Patent No.: US 9,091,100 B2

(45) Date of Patent: Jul. 28, 2015

(54) EAS TAG WITH BENEFIT DENIAL FEATURES

(71) Applicant: Xiao Hui Yang, Saratoga, CA (US)

(72) Inventor: Xiao Hui Yang, Saratoga, CA (US)

(73) Assignee: WG Security Products, Campbell, CA (US)

( * ) Notice: Subject to any disclaimer, the term of this patent is extended or adjusted under 35 U.S.C. 154(b) by 0 days.

(21) Appl. No.: 13/731,817

(22) Filed: Dec. 31, 2012

(65) Prior Publication Data

US 2013/0119145 A1 May 16, 2013

Related U.S. Application Data

(63) Continuation-in-part of application No. 13/428,918, filed on Mar. 23, 2012, now Pat. No. 8,584,958, and a continuation-in-part of application No. 12/815,349, filed on Jun. 14, 2010.

(51) Int. Cl.

| | |
|---|---|
| ***G06K 19/06*** | (2006.01) |
| ***E05B 73/00*** | (2006.01) |
| ***G08B 13/24*** | (2006.01) |
| ***G08B 15/02*** | (2006.01) |
| ***E05B 39/00*** | (2006.01) |

(52) U.S. Cl.

CPC ........... *E05B 73/0017* (2013.01); *E05B 39/002* (2013.01); *G08B 13/2434* (2013.01); *G08B 15/02* (2013.01)

(58) Field of Classification Search

CPC .......... G06K 19/077; G06K 19/07749; G06K 19/0723

USPC .................................................. 235/487, 492

See application file for complete search history.

(56) References Cited

U.S. PATENT DOCUMENTS

| | | | | |
|---|---|---|---|---|
| 4,944,075 | A * | 7/1990 | Hogan | 24/704.1 |
| 5,031,287 | A * | 7/1991 | Charlot et al. | 24/704.1 |
| 5,054,172 | A | 10/1991 | Hogan et al. | |
| 5,680,681 | A | 10/1997 | Fuss | |
| 5,852,856 | A | 12/1998 | Seidel | |
| 6,029,322 | A * | 2/2000 | Belotti et al. | 24/704.1 |
| 6,188,320 | B1 | 2/2001 | Kolton et al. | |
| 6,326,890 | B1 | 12/2001 | Costa | |
| 6,535,130 | B2 | 3/2003 | Nguyen et al. | |
| D478,828 | S * | 8/2003 | Yang et al. | D10/106.91 |
| D478,829 | S | 8/2003 | Yang et al. | |
| 6,624,753 | B2 | 9/2003 | Elston | |
| 6,631,629 | B1 | 10/2003 | Fuss et al. | |
| 6,724,311 | B1 | 4/2004 | Kolton et al. | |
| 6,731,212 | B2 | 5/2004 | Hirose et al. | |

(Continued)

*Primary Examiner* — Paultep Savusdiphol

(74) *Attorney, Agent, or Firm* — Robert R. Waters; Brian W. Foxworthy; Waters Law Group, PLLC

(57) ABSTRACT

An EAS tag includes a cap component with a tack shaft. The cap component is contoured to engage with a body component. The body component has a clutch for receiving and retaining the tack shaft. The shape of the body component and the cap component, along with the position of the tack shaft, provide an initial resistance to twisting the cap with respect to the body. Both the cap and body components may have additional features which interact or interlock to prevent the cap from being twisted. Additionally, the EAS tag may incorporate a staining agent-based benefit denial system. The EAS tag is further adapted to be reusable after actuation of the benefit denial system, and includes a visual indication of a compartment containing a staining agent to serve as a visual deterrent to shoplifters.

6 Claims, 8 Drawing Sheets

(56) References Cited

U.S. PATENT DOCUMENTS

| | | | |
|---|---|---|---|
| D493,739 S | 8/2004 | Copen | |
| D494,487 S | 8/2004 | Sayegh | |
| D502,419 S | 3/2005 | Copen | |
| D503,900 S | 4/2005 | Sayegh | |
| D504,634 S | 5/2005 | Sayegh | |
| D504,839 S | 5/2005 | Sayegh | |
| D505,349 S | 5/2005 | Sayegh | |
| 6,933,847 B2 | 8/2005 | Feibelman | |
| D509,454 S | 9/2005 | Sayegh | |
| 7,190,272 B2 | 3/2007 | Yang et al. | |
| 7,400,254 B2 | 7/2008 | Yang et al. | |
| D578,030 S | 10/2008 | Yang et al. | |
| 7,474,222 B2 | 1/2009 | Yang et al. | |
| D599,242 S | 9/2009 | Yang | |
| 7,633,396 B2 | 12/2009 | Lynce et al. | |
| 7,990,273 B2 * | 8/2011 | Handyside et al. | 340/572.9 |
| 8,134,464 B2 | 3/2012 | Lynch et al. | |
| 8,274,391 B2 | 9/2012 | Yang | |
| 2005/0270161 A1 * | 12/2005 | Yang et al. | 340/572.9 |
| 2007/0051644 A1 * | 3/2007 | Burdett et al. | 206/308.2 |
| 2007/0096925 A1 * | 5/2007 | Yang et al. | 340/572.9 |
| 2009/0058659 A1 * | 3/2009 | Handyside et al. | 340/572.9 |
| 2009/0160644 A1 * | 6/2009 | Yang | 340/571 |
| 2010/0315238 A1 | 12/2010 | Yang | |
| 2012/0206263 A1 | 8/2012 | Yang | |

* cited by examiner

EAS TAG WITH BENEFIT DENIAL FEATURES

CROSS REFERENCE TO RELATED APPLICATIONS

This application is a Continuation-In-Part application based on U.S. patent application Ser. No. 13/428,918, filed Mar. 23, 2012. U.S. patent application Ser. No. 13/428,918 claims priority from U.S. Provisional Application 61/467,958, filed on Mar. 25, 2011. This application is also a Continuation-In-Part Application based on U.S. patent application Ser. No. 12/815,349, filed Jun. 14, 2010. U.S. patent application Ser. No. 12/815,349 claims priority from U.S. Provisional Application 61/187,241, filed on Jun. 15, 2009. The entire disclosures contained in U.S. patent application Ser. No. 13/428,918, U.S. Provisional Application 61/467,958, U.S. patent application Ser. No. 12/815,349, and U.S. Provisional Application 61/187,241, including any attachments thereto, are incorporated herein by reference.

FIELD OF THE INVENTION

This invention relates generally to electronic article surveillance. More specifically, this invention relates to an electronic article surveillance tag comprised of a cap component and a body component which are engageable with one another, said components having features that, once the components are engaged with one another, deter the disengagement of the components from one another. Said electronic article surveillance tag further employs a benefit denial system.

BACKGROUND OF THE INVENTION

A common logistical concern in businesses is the tracking of assets or persons. In retail, one example of this logistical tracking concern is shoplifting. Many retail establishments employ electronic tags attached to goods that can be detected by systems installed for that purpose. A common term for these systems is electronic article surveillance, or EAS.

Many of these tags and systems are only capable of registering the presence of the tag. Transmitters and receivers are located at exit points within a retail environment. The transmitter creates an interrogation zone at the exits to the retail establishment, while the receivers scan for responses from tags passing through the interrogation zone. The transmitters and receivers are typically housed in pedestals. There are several types of tags for these systems, one of which is a harmonic tag and another of which is a resonance tag.

With the harmonic tag, the electromagnetic interrogation field creates stored energy in the harmonic tag. When the interrogation field is turned off, this energy dissipates from the tag and produces a signal which is a harmonic of the interrogation field. The element that stores and dissipates the energy to generate the signal is typically comprised of a ferrite core with a wire coil around it, and it can be tuned to generate a signal at particular frequencies. The system is tuned to the expected frequencies, and the receiver antennas of the system detect these signals. When a signal is detected within an interrogation field, it is assumed that a tag is present and that it is improperly being removed from the retail facility. Similar systems may also be used to identify authorized personnel at control points, etc.

There are many ways used to attach a tag to an article being protected. For clothing and similar items, a tag incorporating a tack is frequently used. The tack has a head with a shaft extending from its head. In one of the many embodiments of the EAS tag, the tack may be included in the cap component of the EAS tag, while the body component of the EAS tag may house a clutch that has an aperture through which the tack shaft may be inserted into the clutch. Various clutches are employed in the art, and depending on the particular clutch, the clutch may be released by mechanical means, application of a magnet to the clutch, or by many other methods.

One clutch that is frequently used is a ball clutch. In a ball clutch, a spindle is located in the interior of a tapered cup which is opened at its larger end and has an aperture through its smaller, closed end. The spindle has a hollow shaft through it which is aligned with an aperture in the tapered cup. Both the aperture in the tapered cup and the hollow shaft through the spindle are at least large enough to accommodate the insertion of the tack shaft. The spindle has apertures through its walls which carry ball bearings that ride on the interior of the tapered cup. When the tack shaft is inserted, the spindle moves to accommodate the shaft. If the shaft is then pulled in an attempt to remove it from the spindle, the ball bearings, the tack, and the tapered cup wedge. The spindle must be retracted prior to pulling the tack, in order for there to be space among the elements within the tapered cup to allow the removal of the tack shaft. In many ball clutches, the spindle is at least partially made of a magnetically attractable material, which allows it to be retracted by application of a magnet.

In many applications, it is desirable that the EAS tag be as small as possible. However, due to the shapes and sizes of the internal elements, the possible arrangements of the internal elements are limited. Some of these possible arrangements result in tag shapes which are vulnerable to tampering. For example, a tag with an elongated shape can provide sufficient purchase so that the cap and body components can be gripped and twisted to separate these two components.

Some embodiments of the current invention include benefit denial systems for theft deterrence. Such benefit denial systems could be used in lieu of, or in addition to, systems employing electronic surveillance elements and/or anti-twisting features. A common form of such a benefit denial system incorporates the use of frangible ink compartments, ampoules, or vials. In the event that a thief attempts to forcibly remove the tag from the item attached to it, the bending or pulling on the tag causes one or more ink compartments to rupture, releasing a staining dye, ink, or other staining agent from the ruptured compartment and onto the attached item. Ink or dye-based systems are often used on clothing items. The destruction of the clothing by staining serves as a deterrent from carrying out the theft.

The prior art for such ink tags has generally included one or more ink compartments located in the tag interior, in close proximity to the tack shaft, in order to facilitate immediate contact of the ink to the clothing. While such arrangements have utility, it could provide an additional advantage to theft deterrence efforts, to have the ink/dye compartment prominently presented on the tag to serve as a visual deterrent, thus making it obvious that attempts to forcibly disengage the item from the surveillance tag will cause the ink or dye to stain the item.

Another common feature of prior art tags is that they are not reusable in the event of breakage to the ink compartment. Due to the location of some ink compartments, breakage causes contamination of the entire tag, so as to cause destruction to any EAS signal elements that may be located within the surveillance tag. The surveillance tag is difficult to clean and the ink vial is often sealed within the enclosure such that a broken vial is often difficult or impossible to replace in the retail setting. Some embodiments may include an ink-based surveillance tag in which the ink compartments would be replaceable. In addition to or in lieu of this feature, some embodiments may be constructed such that at least a portion of the surveillance tag could be easily reused with a minimal amount of clean-up and reconditioning in the event of an ink compartment breakage.

SUMMARY OF THE INVENTION

Some embodiments of the present invention have a body component and a cap component. The body component houses a clutch and an EAS electronic element. The cap component is cupped and generally shaped to match that of the tag body. A tack shaft extends from the concave side of the cap component. A top panel on the body component has an aperture through which the tack shaft is inserted into the body component and into the clutch housed within the body component. To release the clutch, a magnet is applied to the body component opposite to the cap component.

The shapes of the internal elements result in a body component having an oblong shape. This shape can facilitate the twisting of the cap component and body component with respect to each other. To frustrate the twisting of these two components in this manner, the top panel in the body component has at least one male feature extending from the surface of the body component. The cap component has one or more female features within its interior. The one or more female features are sized and located to accept the male features of the body component. The male and female features are joined when the cap component is engaged with the body component. These features deter the rotation of the cap and body components with respect to each other. Additionally, the cap component and the body component are so shaped that the edges of the cap component fit the shape of the body component to minimize any gaps, further reducing opportunities for prying the components apart from one another.

For instance, to prevent tampering with a compactly-configured EAS tag, some embodiments of the present application may incorporate anti-twisting attributes such as rib-like features located within the cap component of the EAS tag, which span the width of the EAS tag, and which are contoured to fit with a dome on the top panel of the body component of the EAS tag in such a manner as to provide added resistance to attempts to disengage the cap component from the body component of the EAS tag.

Some embodiments of the EAS tag which include anti-twist features may also include slots in the rib-like features which accommodate a "male" feature comprised of a ridge located on an elongated dome of the body component of the EAS tag. The male feature could be situated to run approximately perpendicular to the width of the EAS tag and the rib-like features that span its width. A female feature could be located on the cap component of the EAS tag, and could be contoured to receive the male feature, to deter the rotation of the cap component with respect to the body component. Such features could also deter attempts to separate the tack shaft from the clutch through manipulation of the cap and body components.

Some of the many embodiments of the EAS tag may also include scores, or break lines, around the tack head as well as from the leading edge of the cap component to the tack head. When the cap component and body component of the EAS tag are engaged with one another and are attached to an object to be monitored, a prospective thief may attempt to forcibly disengage the cap component's tack shaft from the body component's clutch. In such circumstances, some embodiments may include peripheral break lines running from the edge of the cap component toward the tack head, to provide a starting point for a crack in the cap component, which could place a limit on the amount of force transmitted to the tack shaft.

Some of the many embodiments could include concentric break lines to direct cracking to areas around the tack head. If sufficient force is applied in the course of attempting to disengage the tack shaft from the clutch, the cap component could break away around the tack head, thus denying a thief the ability to disengage the tack shaft from the clutch. Peripheral break lines could also be included for the purpose of providing a crack from the periphery of the cap component to the concentric break line, or to start a crack from the concentric break line which propagates around the tack head without initiating the crack at the periphery of the cap component. In the latter scenario, the entire shell of the cap component could break off and leave a hole in the place where the tack head was previously located. Some of the embodiments of the present application may also incorporate certain anti-twisting features to prevent tampering with a compactly-configured EAS tag.

To deter or discourage efforts to disengage the cap component from the body component by twisting the two components, one of the embodiments of the present application further comprises a benefit-denial component which includes a frangible compartment possessing an ink or staining agent capable of bleeding onto the article to be monitored. The frangible compartment ruptures when attempts are made to forcibly separate the surveillance tag from the article to be monitored, thereby exposing the article to the ink or staining agent.

In some of the many embodiments, the frangible compartment may be constructed of a translucent material through which the ink or staining agent contained within may be seen. Such a feature may provide a visual indication that unauthorized removal of the surveillance tag from the monitored article will cause destruction to the article and prevent the prospective thief from enjoying the benefits of the article, thus serving to deter or discourage attempts at such unauthorized removal.

In embodiments which also include EAS signal-generating elements, the frangible compartment containing the staining agent is sufficiently separated and sealed from the EAS signal-generating elements such that the EAS function itself is not compromised in the event of an ink compartment rupture. Thus, the portion of the tag containing the EAS elements will not be destroyed by ink contamination, so that the tag may be cleaned and re-used. In some embodiments, an ink tag is disclosed in which an ink vial or ink ampoule may be replaced in the retail store as opposed to throwing away the entire tag.

DETAILED DESCRIPTIONS OF THE EMBODIMENTS

The detailed description below of certain embodiments is intended to explain the current invention. It is to be understood that a variety of other arrangements are also possible without departing from the spirit and scope of the invention.

Figure 1:
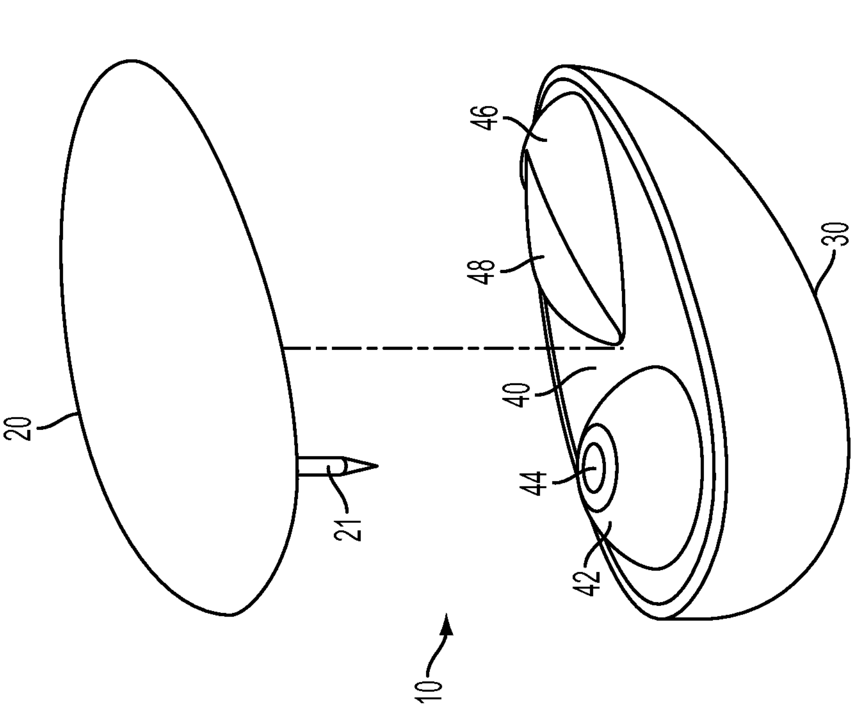
FIG. 1 is a perspective view of an EAS tag cap and body, positioned as if ready to be engaged with one another, or as if after disengagement with one another.

FIG. 1 is a perspective view of an embodiment of an EAS tag 10 having twist prevention features. In FIG. 1, tag cap 20 and tag body 30 are positioned as if ready to be assembled or as if after disassembly. Tack shaft 21 extends from the interior of tag cap 20. Tag cap 20 and tag body 30 have a matching oval outline. Tack shaft 21 extends from the underside of tag cap 20 and is centered in the larger end of the oval of tag cap 20. Clutch dome 42 located on top panel 40 of tag body 30 has aperture 44 which aligns with tack shaft 21 to receive tack shaft 21 when tag cap 20 is assembled with tag body 30. In some embodiments, tack shaft 21 and aperture 44 are located at the larger end of the oval outline, so that the oblong shape of the oval may assist in providing resistance to twisting about tack shaft 21 when tag cap 20 is joined to tag body 30.

Top panel 40 of tag body 30 is shaped to accommodate elements within the interior of tag body 30. Clutch dome 42 accommodates a clutch beneath it, while elongate dome 46 accommodates an EAS signal element beneath it. Aperture 44 provides tack shaft 21 with access to the clutch. When tag cap 20 is assembled to tag body 30, elongate dome 46 extends up into tag cap 20 which provides further resistance to twisting of tag cap 20 and tag body 30 about tack shaft 21.

Figure 2:
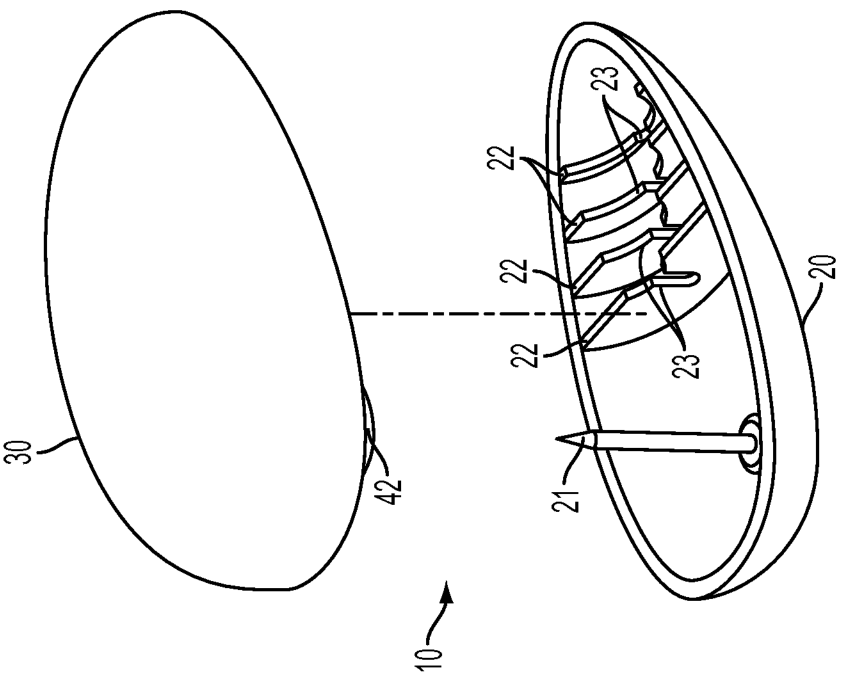
FIG. 2 is a perspective view similar to that of FIG. 1, but the EAS tag body is above the tag cap and the interior of the tag cap is visible.

Turning now to FIG. 2, the interior of tag cap 20 may be seen. In the area of tag cap 20 which covers elongate dome 46 dome of tag body 30, tag cap 20 has several ribs 22 spanning its width. Ribs 22 are contoured to accommodate elongate dome 46 of top panel 40 of tag body 30. The fitting of elongate dome 46 into ribs 22 provides an additional resistance to twisting of tag cap 20 and tag body 30 about tack shaft 21.

Referring again to FIG. 1, extending upward from elongate dome 46 is male feature 48. In FIG. 1, male feature 48 is a fin running along elongated dome 46. In the embodiment shown in FIG. 2, ribs 22 of tag cap 20 each have a female feature in them in the form of slots 23. In combination, slots 23 in ribs 22 are able to accommodate male feature 48 of tag body 30.

The interaction of male feature 48 of tag body 30 and the female feature of tag cap 20, slots 23 of ribs 22, deters the rotation of tag cap 20 with respect to tag body 30. This inhibits attempts to rotate tag cap 20 and tag body 30 with respect to each other to acquire a better hold to force them apart. Additionally, this prevents them from being wiggled with respect to each other to work tack shaft 21 out of the clutch in tag body 30.

Figure 3:
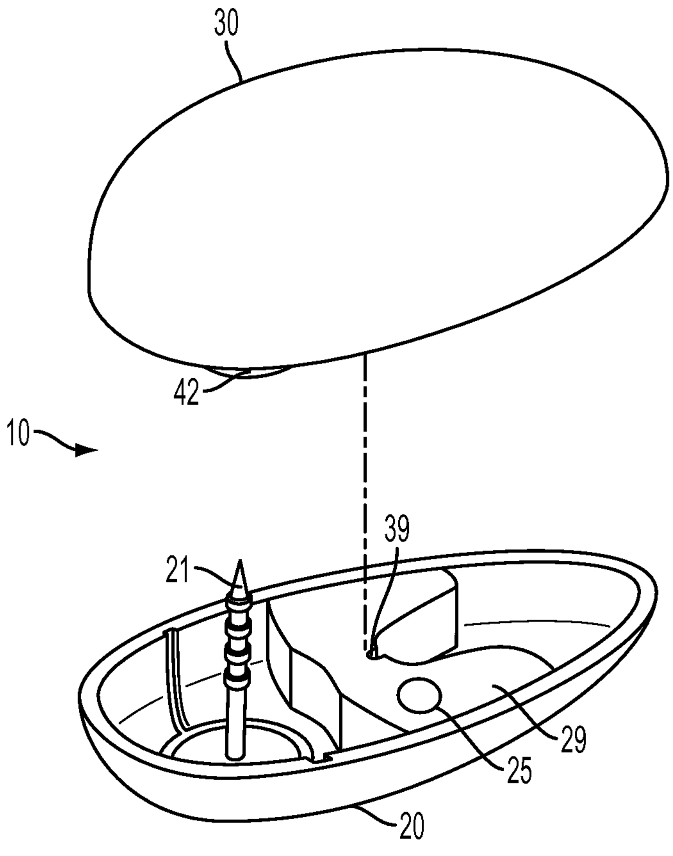
FIG. 3 is a perspective view similar to that of FIG. 2, showing a benefit denial element/compartment in the tag cap.

Ink compartment 29 is shown in FIG. 3. An ink or other staining agent is introduced into ink compartment through ink port 25. Ink compartment 29 is frangible, and is contoured to accommodate elongate dome 46 situated along top panel 40 of tag body 30. Around tack shaft 21, tag cap 20 has sufficient room to accommodate clutch dome 42 of tag body 30.

In FIG. 3, ink compartment 29 of tag cap 20 has indention 39. Indention 39 is located along ink compartment 29. Indention 39 is contoured to match and receive male feature 48 of tag body 30. When tag cap 20 and tag body 30 are fitted together and engaged with one another, tack shaft 21 is engaged with clutch 31 and male feature 48 interlocks with indention 39. Once tag cap 20 and tag body 30 are engaged thusly, an attempt to disengage them through forcibly twisting or rotating them with respect to one another will cause an interaction between male feature 48 and indention 39 that will rupture ink compartment 29 and release the ink or other staining agent contained within ink compartment 29. In some embodiments, the act of twisting or prying tag cap 20 will, by itself, be sufficient to rupture ink compartment 29 without the presence of male feature 48.

Figure 5:
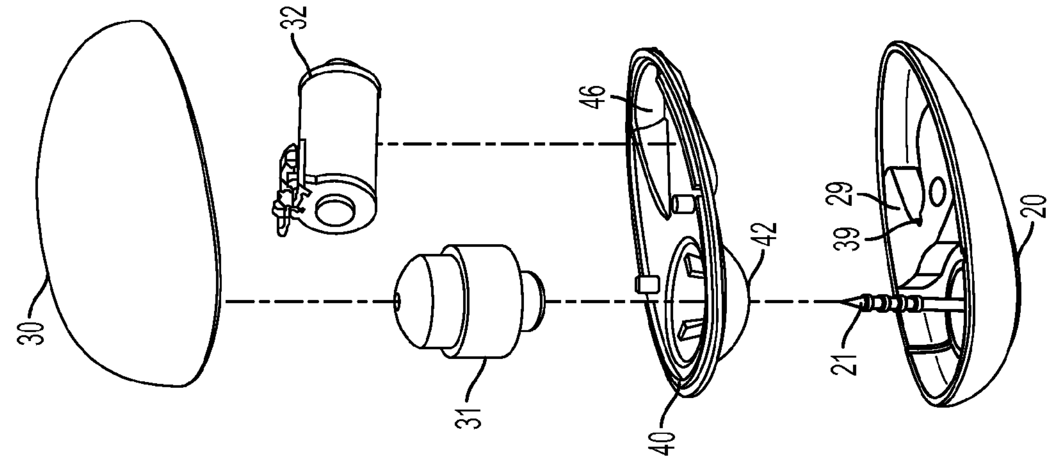
FIG. 5 is an exploded perspective view of the EAS tag of FIGS. 1 and 3.
Figure 4:
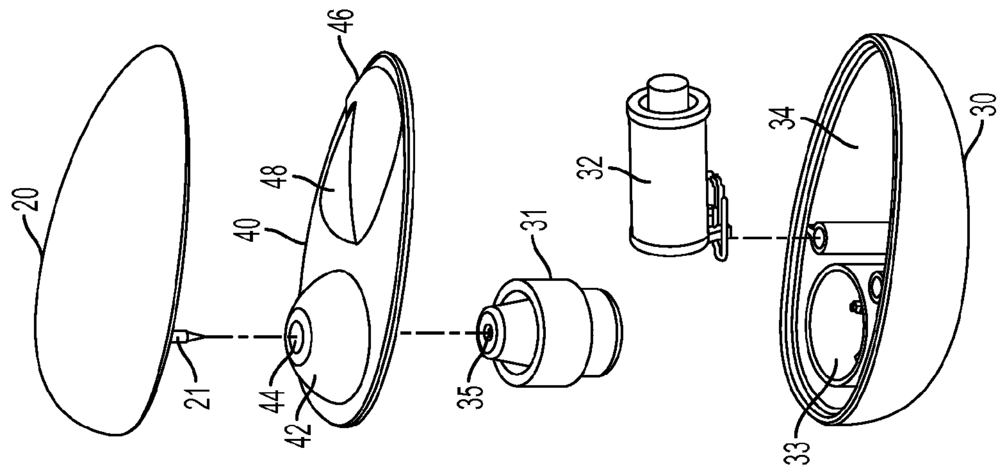
FIG. 4 is an exploded perspective view of the EAS tag of FIGS. 1 and 2.

Referring now to FIG. 4 and FIG. 5, the arrangement of elements internal to tag body 30 may be seen. Clutch 31 is located between clutch dome 42 of top panel 40 and clutch bowl 33 in the interior of tag body 30. EAS signal element 32 is between elongate dome 46 of top panel 40 and chamber 34 in the interior of tag body 30. Clutch 31 has clutch aperture 35 to allow tack shaft 21 to access the interior of clutch 31. Clutch aperture 35 aligns with aperture 44 in top panel 40.

Figure 6:
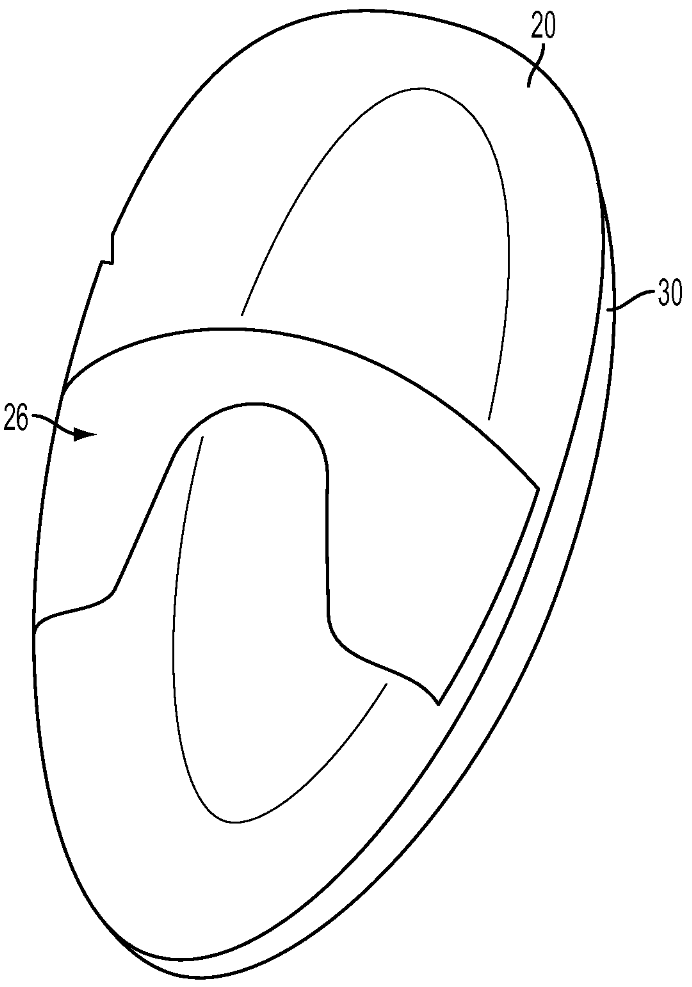
FIG. 6 is a perspective view of an assembled EAS tag, having a benefit denial element/compartment in the tag cap.

FIG. 6 is a perspective view of an EAS tag 10 with twist resisting features, and with tag cap 20 engaged with tag body 30. In FIG. 6, tag cap 20 is seen with window 26, through which the ink or staining agent contained within ink compartment 29 can be seen.

Figure 7:
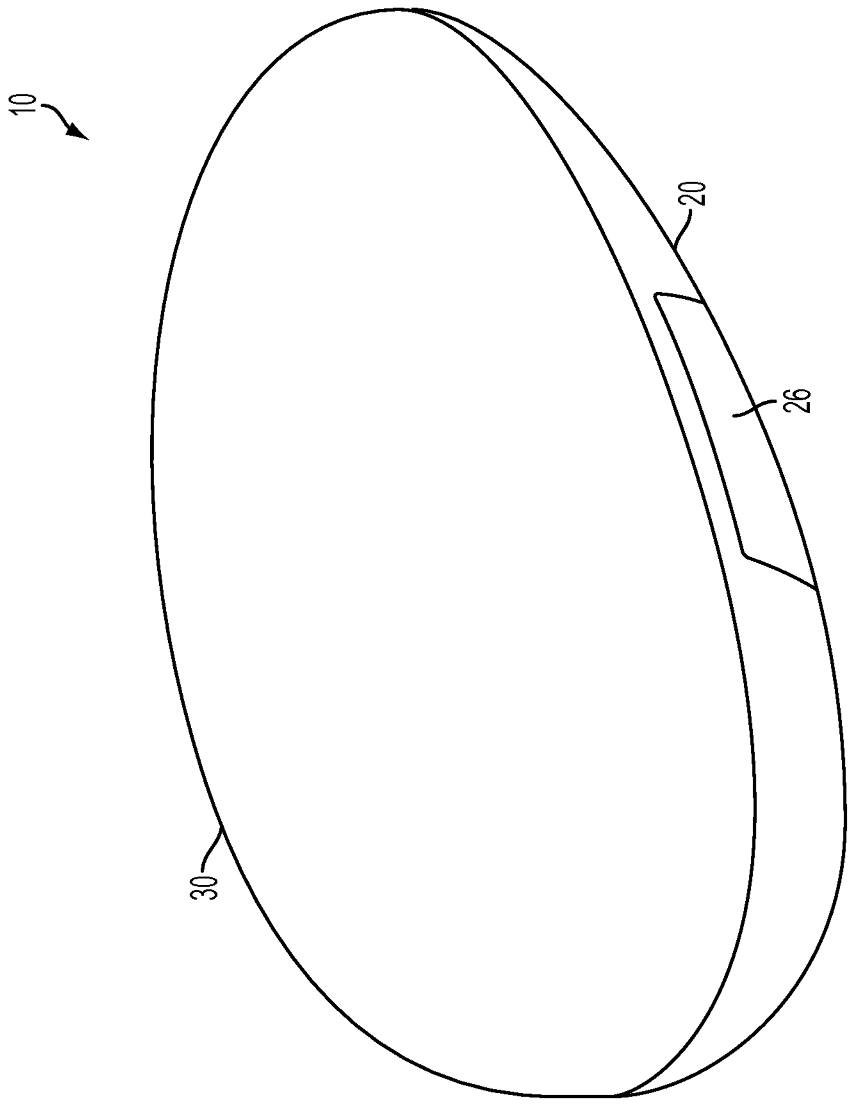
FIG. 7 is a second perspective view of an EAS tag assembled.

FIG. 7 is second perspective view of EAS tag 10 with twist resisting features, with tag cap 20 engaged with tag body 30. The oblong shape of EAS tag 10 and the matching contours of tag cap 20 and tag body 30 are shown apparent in FIGS. 6 and 7.

Figure 8:
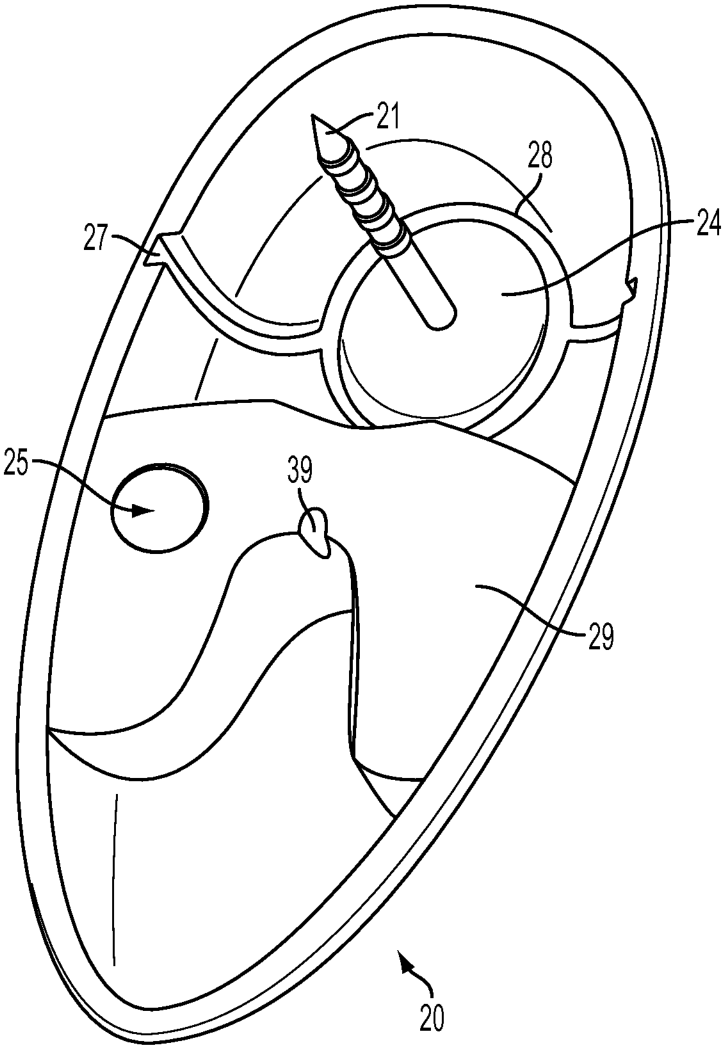
FIG. 8 is a perspective view of the interior of a tag cap of an EAS tag, having a benefit denial element/compartment in the tag cap.

FIG. 8 is a perspective view of an embodiment of tag cap 20 of EAS tag 10. In the embodiment of FIG. 8, tack head 24 is molded into tag cap 20 and tack shaft 21 extends from tack head 24. In FIG. 8, ink compartment 29 is seen with indention 39, and with ink port 25 located on ink compartment 29.

Tag cap 20 has reduced thickness around tack head 24 and also leading from the edge of tag cap 20 to tack head 24. These areas of reduced thickness are peripheral break lines 27 and concentric break lines 28.

When EAS tag 10 is attached to an object to be protected by inserting tack shaft 21 of tag cap 20 into aperture 44 of clutch dome 42 located on tag body 30, a thief may attempt to forcibly remove tack shaft 21 from clutch 31 within tag body 30, by prying tag cap 20 from tag body 30. Alternatively, a thief may work the small end of tag cap 20 back and forth in a rotational manner to work tack shaft 21 out of clutch 31 located within tag body 30. When EAS tag 10 is handled in such a manner, peripheral break lines 27 running from the edge of tag cap 20 toward tack head 24 provide a starting point for a crack in tag cap 20 to place a limit on the amount of force transmitted to tack shaft 21.

Concentric break line 28 directs a crack around tack head 24. If sufficient force is applied to tack cap 20, one or both ends of tack cap 20 may break away around tack head 24. This denies a thief purchase on tack head 24 for working tack shaft 21 out of clutch 44. While peripheral break lines 27 are intended to provide a crack path from the periphery of tag cap 20 to concentric break line 28, in some embodiments, or in some situations, a crack may start in concentric break line 28 and propagate around tack head 24 without initiation of the crack at the periphery of tag cap 20. In those cases, the entire shell of tag cap 20 would break off and leave a hole where tack head 24 was previously.

Figure 9:
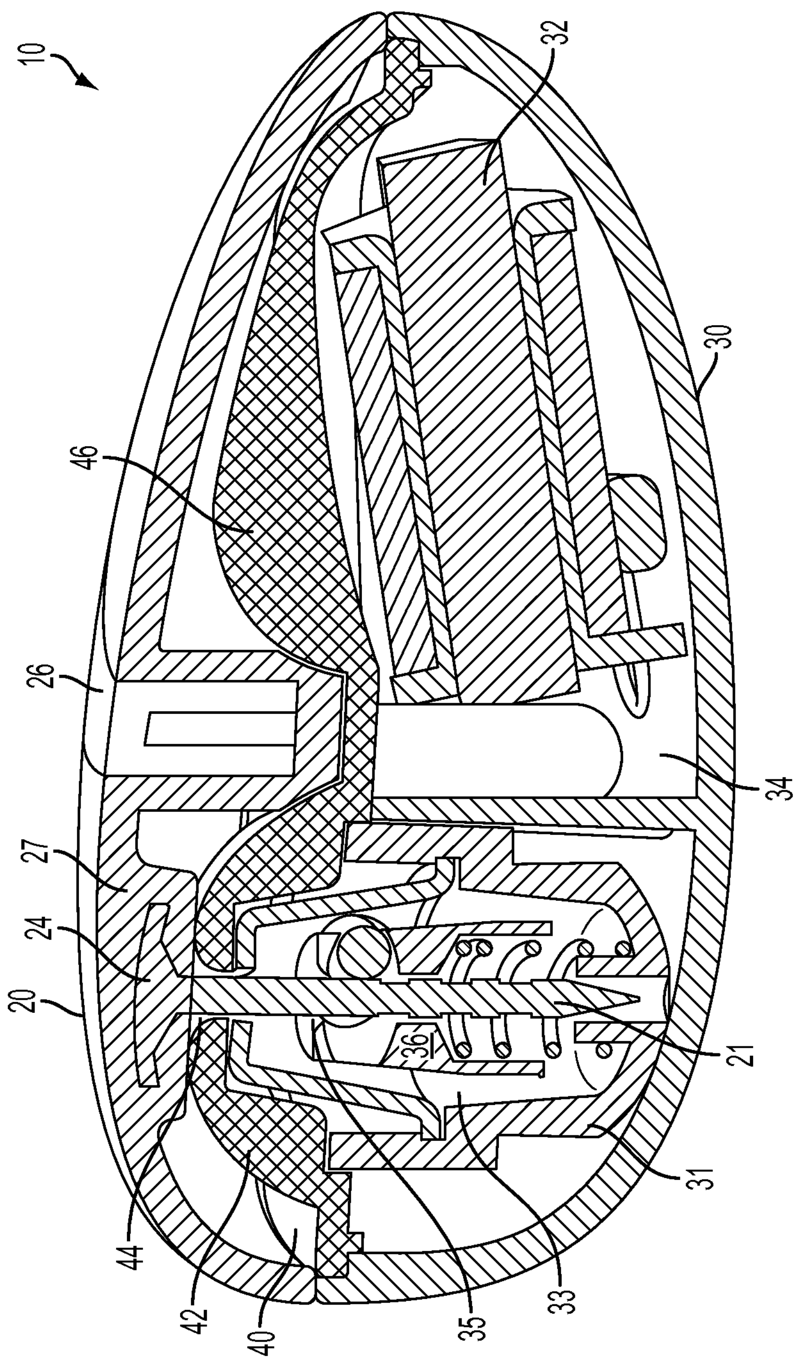
FIG. 9 is a side cross section view of a tag body and tag cap of an EAS tag, having a benefit denial element/compartment in the tag cap.

FIG. 9 is a cross section view of tag body 30 and tag cap 20 of EAS tag 10. In FIG. 9, clutch 31 may be seen beneath clutch dome 42 of top panel 40 and EAS signal element 32 may be seen in chamber 34 in the interior of tag body 30, beneath elongate dome 46 of top panel 40. The embodiment of EAS signal element 32 shown in FIG. 9 is core and coil type passive element, but other types of EAS signal elements could be employed. Clutch spindle 36 in clutch 31 is at least partially made of a magnetically attractable material. Application of a magnet to tag body 30 in proximity to the narrower end of tack shaft 21 biases clutch spindle 36 away from tack head 24, allowing tack shaft 21 to be withdrawn from aperture 44 of clutch dome 42.

Figure 10:
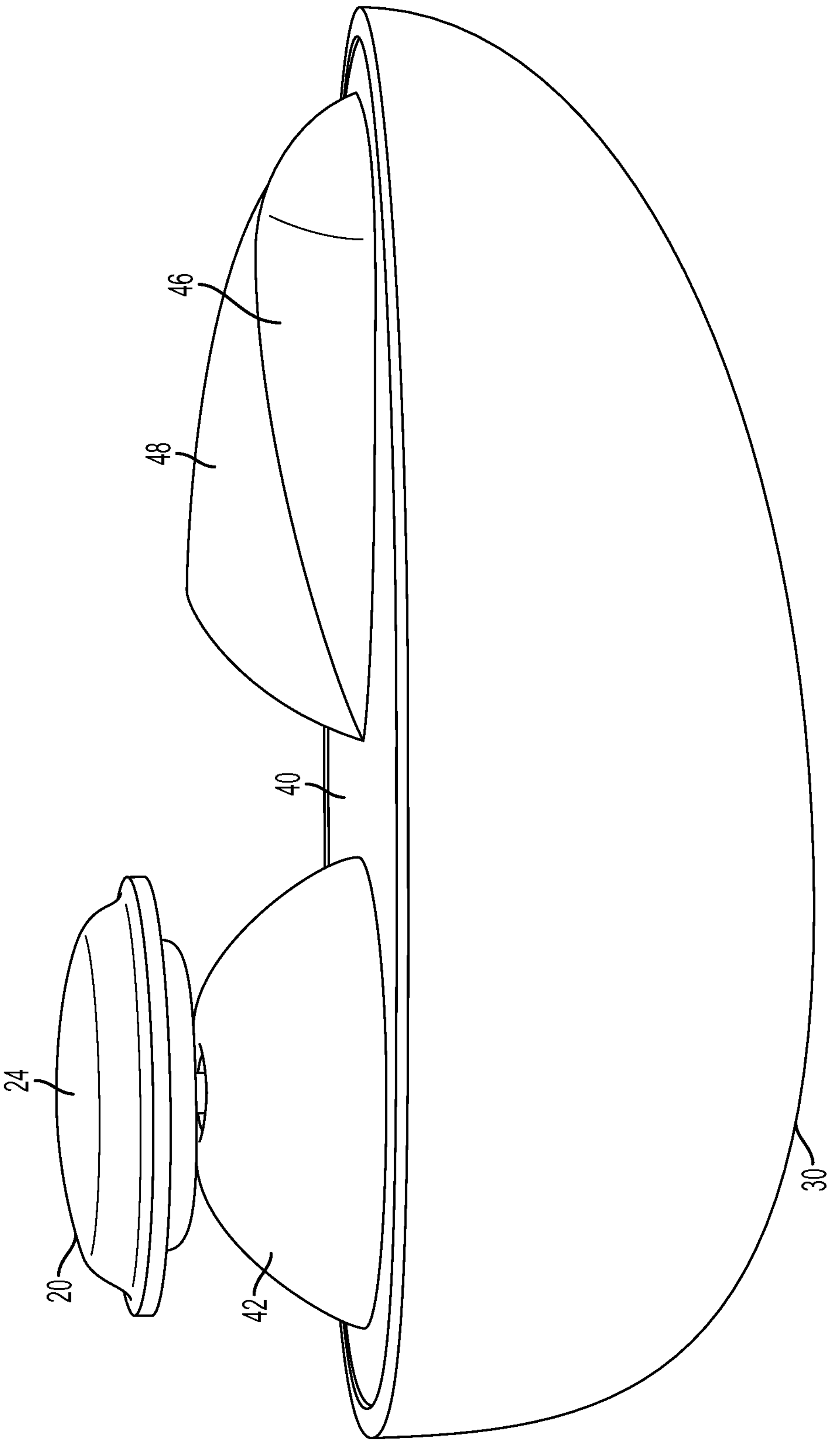
FIG. 10 is a side perspective view of the tag body and tag cap of an EAS tag, with the cover portion of the tag cap broken away.

FIG. 10 is a side perspective view of tag body 30 and tag cap 20 of EAS tag 10, with the cover portion, or shell, of tag cap 20 broken away. Tack head 24 remains to keep EAS tag 10 attached to an object to be protected. EAS tag 10 can be removed from the object by application of a magnet to tag body 30 opposite to tack head 24.

While the general shape of tag cap 20 and tag body 30 are oval, especially at their matching periphery, that need not be the only shape utilized. Other shapes of peripheries could be used. For example, even a circular periphery could be used as long as the tack shaft of the tag cap and the aperture of the tag body were not centered within the circular periphery.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

I claim:

1. An electronic article surveillance tag, comprising:

a tag cap comprising a concave shell having an edge, a tack head imbedded in said concave shell, a tack shaft extending from said tack head into the concavity of said concave shell;

a tag body with a hollow interior housing an EAS sensor and a releasable clutch for receiving said tack shaft, said tag body having a top surface with an aperture to allow said tack shaft access to said releasable clutch, said top surface of said tag body further comprising a male feature, said male feature offset from said aperture; and, a frangible compartment in said concave shell, said frangible compartment offset from said tack head and tack shaft and containing a staining agent, said frangible compartment defining a female feature facing away from said concave shell; wherein, when said tack shaft is inserted into said releasable clutch said male feature inserts into said female feature.

2. The electronic article surveillance tag of claim 1, wherein:

said frangible compartment is constructed to comprise at least a portion of the outer surface of said tag cap;

said frangible compartment further being comprised of a translucent material;

said staining agent being visible through said translucent material.

3. The electronic article surveillance tag of claim 1, further comprising;

a path of reduced thickness in said tag cap, to precipitate a crack in said concave shell when said tag cap is overstressed.

4. The electronic article surveillance tag of claim 3, wherein;

said path of reduced thickness intersects said edge of said concave shell.

5. The electronic article surveillance tag of claim 3, wherein;

said path of reduced thickness circumscribes said tack head.

6. The electronic article surveillance tag of claim 1, wherein;

said tack head is molded into said tag cap.

* * * * *